United States Patent [19]

Nishikawa et al.

[11] Patent Number: 4,628,772

[45] Date of Patent: Dec. 16, 1986

[54] BACK-UP DEVICE FOR AN ELECTRONIC CONTROL SYSTEM OF AN AUTOMATIC TRANSMISSION

[75] Inventors: Masao Nishikawa, Nerima; Yoshimi Sakurai, Tanashi, both of Japan

[73] Assignee: Honda Giken Kogyo Kabushiki Kaisha, Tokyo, Japan

[21] Appl. No.: 775,620

[22] Filed: Sep. 13, 1985

[30] Foreign Application Priority Data

Sep. 13, 1984 [JP] Japan ................................ 59-190642

[51] Int. Cl.$^4$ ............................................. B60K 41/06
[52] U.S. Cl. ......................................... 74/866; 74/865; 74/868; 74/869
[58] Field of Search ................. 74/869, 868, 867, 866, 74/865, 862

[56] References Cited

U.S. PATENT DOCUMENTS

| | | | |
|---|---|---|---|
| 3,927,579 | 12/1975 | Golan | 74/868 X |
| 4,082,013 | 4/1978 | Dornfeld et al. | 74/866 |
| 4,432,255 | 2/1984 | Borman et al. | 74/869 |
| 4,462,279 | 7/1984 | Sumiya | 74/867 X |
| 4,485,695 | 12/1984 | Kawamoto | 74/866 X |
| 4,488,457 | 12/1984 | Nishimura et al. | 74/869 X |
| 4,519,273 | 5/1985 | Shimizu et al. | 74/867 X |
| 4,558,612 | 12/1985 | Shimizu et al. | 74/866 X |
| 4,570,511 | 2/1986 | Nishimura et al. | 74/867 |

FOREIGN PATENT DOCUMENTS 2705930 8/1977 Fed. Rep. of Germany ........ 74/869

Primary Examiner—Leslie Braun
Assistant Examiner—Dwight G. Diehl
Attorney, Agent, or Firm—Lyon & Lyon

[57] ABSTRACT

A back-up device for an electronic control system of an automatic transmission in an automotive vehicle, of the type including at least first and second frictionally engaging elements hydraulically actuable, respectively, for establishing a first speed ratio for lower speed running of the vehicle and a second speed ratio for higher speed running of same, selector valves adapted to selectively assume first and second positions, respectively, for connecting the first and second frictionally engaging elements to an operating fluid source, electromagnetic valves for driving the selector valves to select the first position or the second position, and an electronic control unit for selectively energizing and deenergizing the electromagnetic valves in accordance with a predetermined gear shifting manner responsive to electrical signals indicative of the vehicle speed and the engine output. The back-up device comprises a vehicle speed sensing device for generating an output signal having a value thereof increasing as the vehicle speed increases, and a control mechanism for causing the selector valves to assume the second position, irrespective of the operation of the electromagnetic valves, when the value of the output signal from the vehicle speed sensing device exceeds a predetermined value, thereby prohibiting establishment of the first speed ratio in the event of failure in the electronic control system during high running of the vehicle.

6 Claims, 7 Drawing Figures

BACK-UP DEVICE FOR AN ELECTRONIC CONTROL SYSTEM OF AN AUTOMATIC TRANSMISSION

BACKGROUND OF THE INVENTION

This invention relates to an electronic control system of an automatic transmission for internal combustion engines, and more particularly to a back-up device for the electronic control system.

In an electronic control system for electronically controlling the gear shifting operation of an automatic transmission in an internal combustion engine for automotive vehicles, when an electronic control unit of the system malfunctions to select a gear having too low a speed reduction ratio or a reduction ratio too large for a speed at which the vehicle is running, the engine undergoes overrevolution and can be damaged. Supposing for instance that when a vehicle equipped with an automatic transmission having four forward speed ratios, is running with the fourth speed ratio (TOP) established, its electronic control unit becomes defective so that the second speed gear or the first speed gear (LOW) is selected, the engine will undergo overrevolution and can be damaged owing to a large difference in gear ratio between the fourth speed gear and the second speed gear or the first speed gear (LOW). Particularly, since no one-way clutch which permits transmission of torque only from the engine to the driving wheels is provided between the second speed driven gear and the counter shaft, the engine is driven by the driving wheels when gear shifting takes place from the fourth speed gear to the second speed gear, and can be damaged by overrevolution even if the throttle pedal is returned from its stepped-on position. The possibility of damage to the engine due to overrevolution is high particularly when gear shifting takes place from the fourth speed ratio to the second speed ratio or the first speed ratio while the vehicle is running at a high speed. Similarly the engine can undergo overrevolution when the electronic control unit malfunctions to cause gear shifting from the fourth speed ratio to the third speed ratio while the vehicle is running with the fourth speed ratio established. However, since generally the third speed gear ratio is relatively small and suitable for high speed running, the possibility of overrevolution of the engine is very small.

SUMMARY OF THE INVENTION

It is an object of the invention to provide a back-up device for an electronic control system of an automatic transmission in an automotive vehicle, which is capable of preventing the engine from overrevolution by prohibiting selection of a gear of lower speed ratios when failure occurs in the electronic control system during running of the vehicle.

It is a further object of the invention to provide a back-up device of this kind which utilizes governor pressure proportionate to the vehicle speed for prohibiting selection of a gear of lower speed ratios in the event of failure in the electronic control system, and can therefore be simple in construction and low in cost.

It is another object of the invention to provide a back-up device of this kind which permits the vehicle to start from its standing position, with the first speed gear or the second speed gear engaged, by virtue of the utilization of the governor pressure, thereby obtaining sufficient accelerability of the vehicle.

The present invention provides an electronic control system of an automatic transmission in an automotive vehicle, the automatic transmission having at least two speed ratios including a first speed ratio for lower speed running of the vehicle and a second speed ratio for higher speed running of the vehicle, and forming part of a power transmission system connected between an engine of the vehicle and driving wheels of the vehicle. The electronic control system includes a first frictionally engaging element hydraulically actuatable for establishing the first speed ratio, a second frictionally engaging element hydraulically actuatable for establishing the second speed ratio, an operating fluid source, selector valve means for selectively connecting the operating fluid source to the first and second frictionally engaging elements, the selector valve means being adapted to selectively assume a first position for establishing the first speed ratio and a second position for establishing the second speed ratio, electromagnetic valve means for driving the selector valve means to select the first position or the second position, and electronic control means for selectively energizing and deenergizing the electromagnetic valve means in accordance with a predetermined gear shifting manner responsive to an electrical signal indicative of the speed of the vehicle and an electrical signal indicative of output from the engine.

The electronic control system includes a back-up device which comprises vehicle speed sensing means for generating an output signal having a value thereof increasing as the speed of the vehicle increases, and control means for causing the selector valve means to assume the second position irrespective of the operation of the electromagnetic valve means, when the value of the output signal from the vehicle speed sensing means exceeds a predetermined value.

The above and other objects, features and advantages of the invention will be more apparent from the ensuing detailed description taken in conjunction with the accompanying drawings.

DETAILED DESCRIPTION

The invention will now be described in detail with reference to the drawings showing embodiments thereof.

Figure 1:
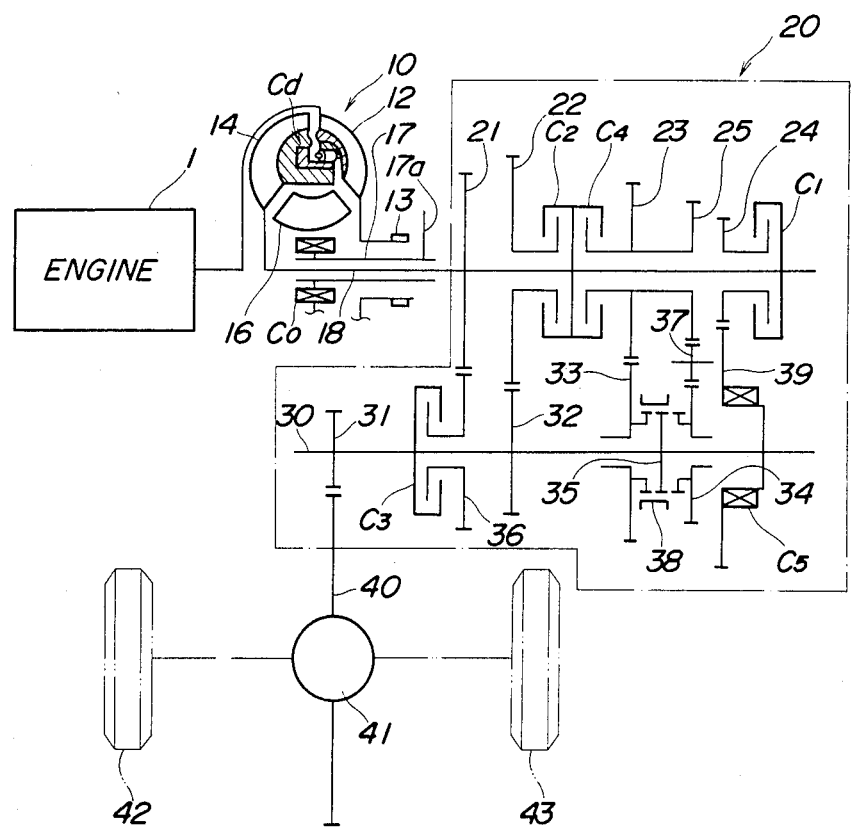
FIG. 1 is a schematic view of an automatic transmission, to which the back-up device according to the invention is applicable.

FIG. 1 schematically illustrates the arrangement of an automatic transmission for automotive vehicles, to which the invention is applied. Output from an engine 1 is first transmitted to a pump 12 of a hydraulic torque converter (hereinafter merely called "the torque converter") 10, and then to a turbine 14 in a hydrodynamic manner. When amplification of torque takes place within the torque converter 10 due to a difference in the rotational speed between the pump 12 and the turbine 14, the resulting reaction force is borne by a stator 16. A gear 13 is mounted on the pump 12 for driving an oil hydraulic pump 50 appearing in FIG. 2. When the reaction force acting upon the stator 16 exceeds a predetermined value, a stator shaft 17 rotates and urges a regulator valve 60 appearing in FIG. 2 with an arm 17a provided at one end of the stator shaft 17, to thereby increase fluid line pressure, i.e. discharge pressure of the oil hydraulic pump 50. When amplification of torque does not take place within the torque converter 10, the stator 16 rotates relative to the stator shaft 17 via a one-way clutch C0. Then, the pump 12, the turbine 14 and the stator 16 rotate in the same direction.

Figures 2, 2A, 2B:
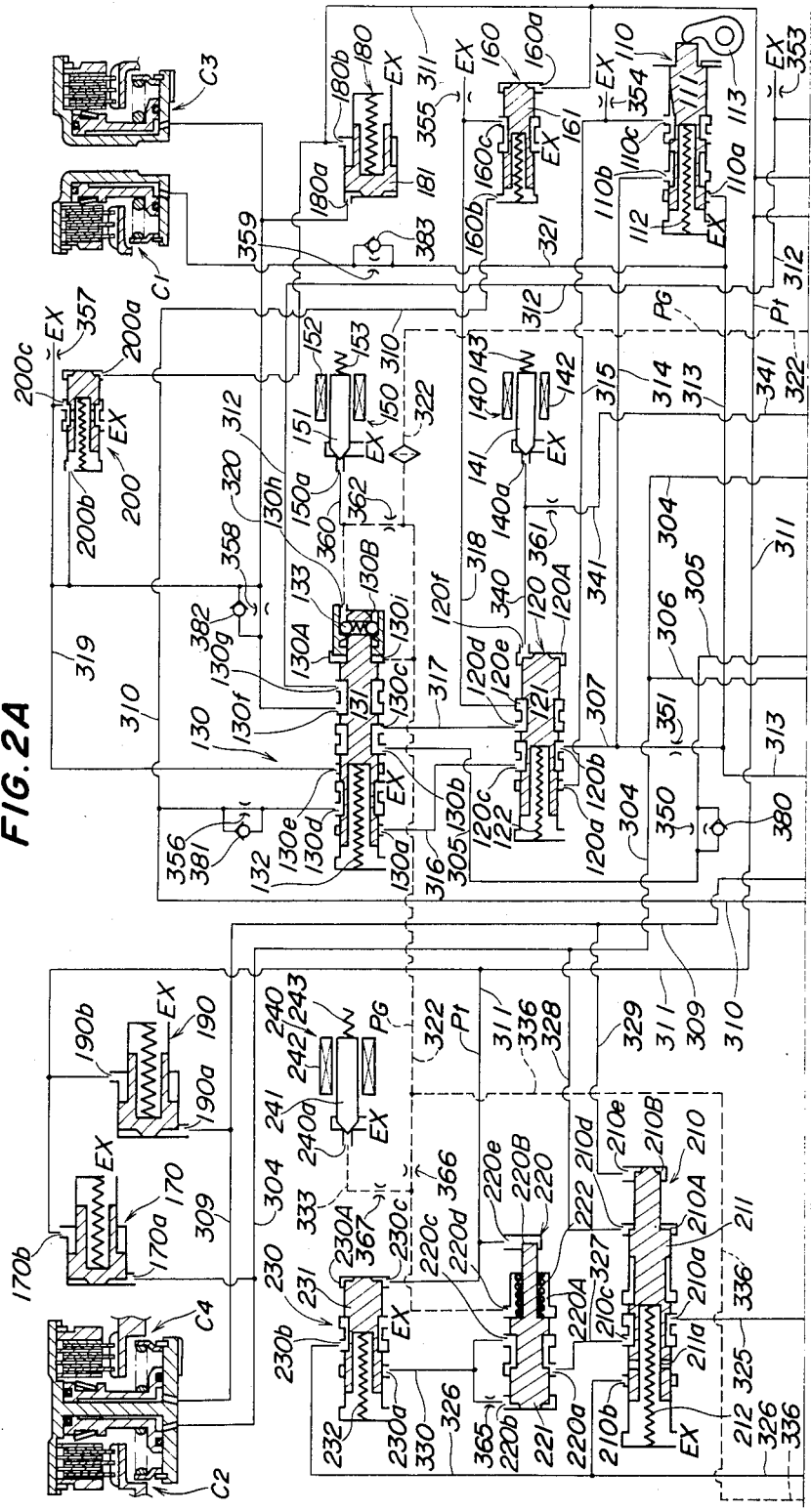
FIG. 2 is a block diagram of FIGS. 2A and 2B.
FIGS. 2A and 2B are a circuit diagram illustrating a hydraulic control system incorporating a first embodiment of the back-up device according to the invention applied to the automatic transmission in FIG. 1.
Figure 2B:
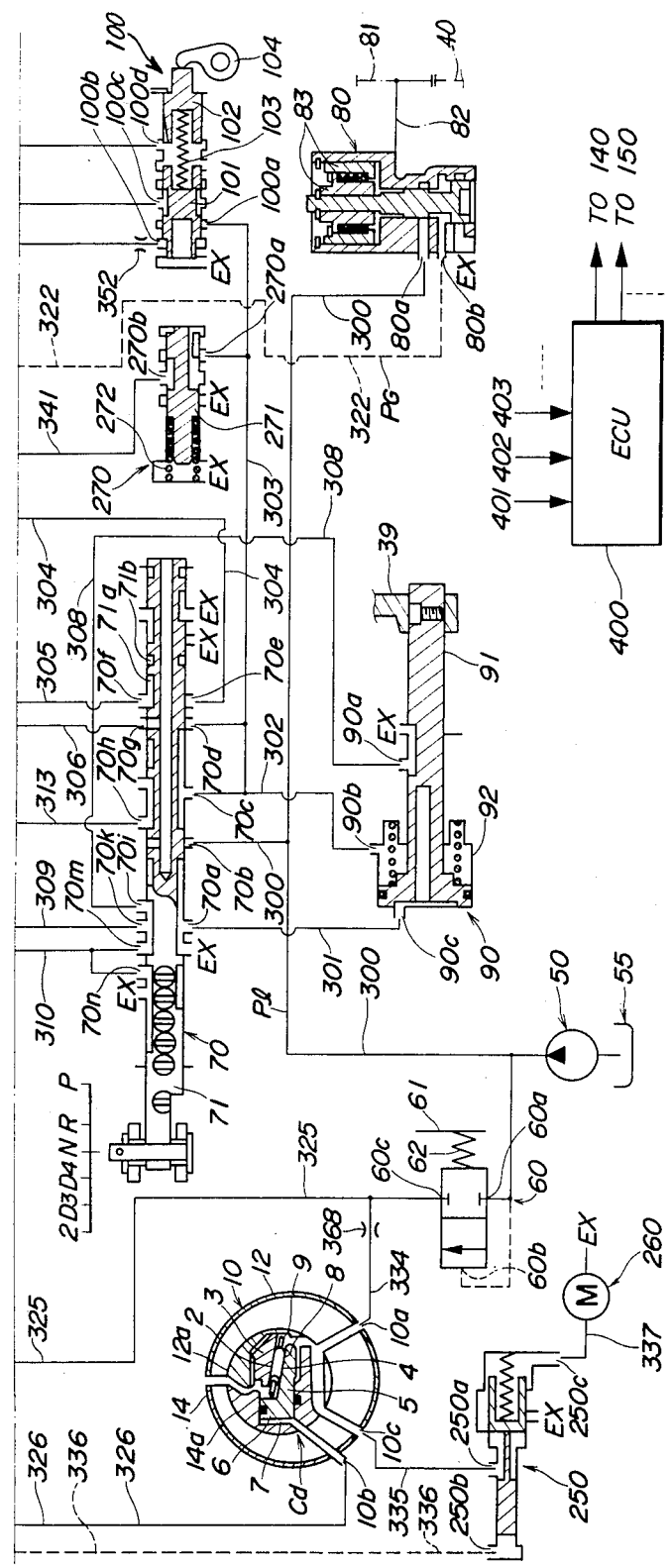

Interposed between the pump 12 and the turbine 14 of the torque converter 10 is a direct-coupling hydraulic clutch Cd which is, as shown in FIG. 2 in greater detail, constructed as follows: An annular driving member 3 having a driving conical surface 2 at its inner periphery is secured to an inner peripheral wall 12a of the pump 12, while an annular driven member 5, which has a driven conical surface 4 at its outer periphery extending parallel with the driving conical surface 2, is slidably spline-fitted in an inner peripheral wall 14a of the turbine 14 for axial movement relative thereto. The driven member 5 has its one end formed integrally with a piston 6 which is slidably received within an oil hydraulic cylinder 7 formed in the inner peripheral wall 14a of the turbine 14. The piston 6 receives a pressure in the cylinder 7 and a pressure in the torque converter 10 at the same time, at its both or left and right end faces, respectively.

Cylindrical clutch rollers 8 are interposed between the driving and driven conical surfaces 2, 4 and retained in place by an annular retainer 9 in such a manner that the clutch rollers 8 each have its axis inclined by a predetermined angle relative to the generating line of a virtual conical surface, which extends between the conical surfaces 2, 4 along the middle thereof. When the torque converter 10 is not required to amplify the torque transmitted thereto, an oil pressure which is higher than the internal pressure of the torque converter 10 is supplied to the cylinder 7 to cause the piston 6, i.e. the driven member 5, to move toward the driving member 3, whereby the clutch rollers 8 are urgedly held between the conical surfaces 2, 4. With the clutch rollers 8 thus urgedly held between the conical surfaces 2, 4, if output torque from the engine 1 acts upon the driving member 3 to cause the same to drive the driven member 5 (since some load is applied on the torque converter), the clutch rollers 8 rotate about their own axes to cause relative axial displacement of the members 3, 5 in a direction such that the members 3, 5 approach toward each other. Consequently, the clutch rollers 8 bitingly engage with the conical surfaces 2, 4 to establish mechanical coupling between the members 3 and 5, i.e. between the pump 12 and the turbine 14 of the torque converter 10.

Even on this occasion, if engine output torque exceeding the coupling force of the direct-coupling clutch Cd is applied between the pump 12 and the turbine 14, the clutch rollers 8 can slip on the conical surfaces 2, 4 to divide the engine output torque into two parts, wherein part of the torque is mechanically transmitted through the direct-coupling clutch Cd while the remaining torque is hydrodynamically transmitted from the pump 12 to the turbine 14. Therefore, the ratio between the mechanically transmitted torque and the hydrodynamically transmitted torque is variable dependent on the degree of slipping of the clutch rollers 8.

On the other hand, if a reverse load is applied to the torque converter 10 during operation of the direct-coupling clutch Cd, the rotational speed of the driven member 5 becomes higher than that of the driving member 3, that is, the driving member 3 rotates in a certain direction relative to the driven member 5. Consequently, the clutch rollers 8 rotate in a direction reverse to that mentioned above, to cause relative axial displacement of the members 3, 5 in a direction of moving the members 3, 5 away from each other. Thus, the clutch rollers 8 are released from biting engagement with the conical surfaces 2, 4 to run idle so that the reverse load is transmitted from the turbine 14 to the pump 12 only in a hydrodynamic manner.

As the cylinder 7 is released from the oil pressure, the piston 6 is displaced to its initial position by the internal pressure of the torque converter 10 acting thereupon, thus rendering the direct-coupling clutch Cd inoperative.

Referring to FIG. 1, the torque converter 10 has an output shaft 18 also serving as an input shaft of an auxiliary transmission 20. Secured on the output shaft 18, i.e. the input shaft of the auxiliary transmission 20, are a third-speed driving gear 21, a second-speed clutch C2, a fourth-speed (TOP) clutch C4, and a first-speed clutch Cl, which are arranged in the order mentioned from left to right in the figure. A second-speed driving gear 22, a fourth-speed driving gear 23, and a first-speed driving gear 24 are freely fitted on the input shaft 18 in a manner such that they normally are rotatable relative to the input shaft 18, whereas they rotate in unison with the input shaft 18 when the clutches C2, C4 and Cl become engaged, respectively. A reverse driving gear 25 is formed integrally with the fourth-speed driving gear 23.

Secured on a countershaft 30, which extends parallel with the input shaft 18, are a final driving gear 31, a third-speed clutch C3, a second-speed driven gear 32, a spline 35 selectively engageable with a fourth-speed driven gear 33 or with a reverse driven gear 34, and a first-speed driven gear 39, which are arranged in the order mentioned from left to right in FIG. 1. A one-way clutch C5 is arranged between the first-speed driven gear 39 and the countershaft 30, to permit transmission of engine torque only in a direction of causing rotation of driving wheels 42 and 43 of the vehicle. A third-speed driven gear 36, a fourth-speed driven gear 33, and the reverse driven gear 34 are fitted on the counter shaft 30 in a manner such that normally they are rotatable about and relative to the shaft 30, while the third-speed driven gear 36 rotates in unison therewith when the third-speed clutch C3 becomes engaged. The reverse gears 25 and 34 engage with each other through an idle gear 37. Also, a selector sleeve 38 is arranged in a manner such that it can selectively cause the fourth-speed driven gear 33 or the reverse driven gear 34 to engage with the spline 34 on the counter shaft 30 as it is shifted by a servo piston 90, shown in FIG. 2. Driving torque is transmitted from the final driving gear 31 to a final driven gear 40 engaging therewith, and then to the left and right driving wheels 42, 43 through a differential gear 41 formed integrally with the final driven gear 40. Incidentally, to drive the vehicle in reverse, a selector sleeve 38 which is disposed around the countershaft 30 is shifted to the right as viewed in the figure, by means of a shift fork, not shown, to engage the countershaft 30 with the reverse driven gear 34, and at the same time the fourth-speed clutch C4 is engaged. Thus, engine torque is transmitted to the left and right driving wheels 42, 43 to drive the vehicle in reverse.

FIG. 2 shows a hydraulic control circuit incorporating the back-up device according to the invention.

Referring to FIG. 2, the oil hydraulic pump 50 is connected through a fluid line 300 to ports 60a, 60b of a regulator valve 60, as well as to a port 70b of a manual shift valve (hereinafter referred to as "the manual valve") 70, and a port 80a of the governor valve 80. Ports 70a and 70c of the manual valve 70 are connected, respectively, to ports 90c and 90b of a spring chamber 92 of the servo piston 90 through respective fluid lines 301 and 302, and the port 70c is further connected through a fluid line 303 to a port 70d as well as to a port 100a of a throttle valve 100. A port 70e is connected through a fluid line 304 to the second-speed clutch C2 as well as to a port 170a of an accumulator 170. A port 70f is connected to a port 130b of the shift or selector valve 130 through a fluid line 305, in which a restriction 350 and a one-way valve 380 are provided in parallel to each other. A port 70g is connected through a fluid line 306 to a fluid line 304. A port 70h is connected to a port 120b of a shift valve 120 through a fluid line 307 provided with a restriction 351. A port 70i is connected through a fluid line 308 to a port 90a of the servo piston 90. A port 70k is connected through a fluid line 309 to the fourth-speed clutch C4 as well as to a port 190a of an accumulator 190. A port 70m is connected to a port 160b of a control valve 160 through a fluid line 310, to which is connected a port 70n.

A port 100b and a port 100c of the throttle valve 100 are connected to a fluid line 311, by way of which they are connected to respective ports 170b, 190b, and 180b of accumulators 170, 190, and 180 and also to respective ports 160a and 200a of control valves 160 and 200, the port 100b being connected to the fluid line via a restriction 352. A port 100d is connected through a fluid line 312 provided with a restriction 353 to a drain line EX. Ports 110a and 110b of a control valve 110 are connected, respectively, through fluid lines 313 and 314 to a fluid line 307 at respective sides of a restriction 351. A port 110c is connected to the drain line EX through a fluid line 315 provided with a restriction 354.

A port 120a of a shift or selector valve 120 is connected to the fluid line 315, and ports 120c and 120d are connected through respective fluid lines 316 and 317 to ports 130a and 130c of a shift valve 130, respectively. A port 120e is connected to a tank 55 through a fluid line 318 provided with a restriction 355. A port 160c of a control valve 160 is connected to a fluid line 318. A port 130d of the shift valve 130 is connected to a fluid line 310 by way of a restriction 356, parallel to which is provided a one-way valve 381. A port 130e is connected to a fluid line 319 which passes through a restriction 357 and terminates in the drain line EX. A port 130f is connected to the third-speed clutch C3 through a fluid line 320, in which a restriction 358 and a one-way valve 382 are provided in parallel to each other. A port 130g is connected to a fluid line 312.

The first-speed clutch C1 is connected to the fluid line 313 through a fluid line 321, in which a restriction 359 and a one-way valve 383 are provided in parallel to each other. A port 200b of the control valve 200 is connected to the inlet port of the one-way valve 382 connected to the fluid line 320, while a port 200c is connected to a fluid line 319.

A port 120f of the shift valve 120 is connected to a port 140a of a solenoid valve 140, as well as to a port 270b of a pressure-reducing valve 270 through a fluid line 341 provided with a restriction 361. A port 270a of this pressure reducing valve 270 is connected to a fluid line 300 and subject to the line pressure P1 created by the oil hydraulic pump 50. A port 130h of the shift valve 130 is connected, on one hand, to a port 150a of a solenoid valve 150 through a drain line 360 leading to a tank 55 and, on the other hand, to a fluid line 322 by way of a restriction 362. A port 130i is connected to the fluid line 322, which leads to the outlet port 80b of the governor valve 80.

An outlet port 60c of the regulator valve 60 is connected through a fluid line 325 to a port 210a of a timing valve 210, which has a port 210b connected to a fluid line 326, a port 210c connected through a fluid line 327 to a port 220a of a modulator valve 220, and ports 210d and 210e connected through fluids 328 and 329, respectively, to fluid lines 304 and 309. The modulator valve 220 has a port 220b connected through a fluid line 330 provided with a restriction 365 to a port 230a of an on-off valve 230, a port 220d connected by way of a restriction 366 to a fluid line 322, and a port 220e connected to a fluid line 311. The on-off valve 230 has a port 230b connected to a fluid line 326, and another port 230c connected to a fluid line 331.

A port 240a of a solenoid valve 240 is connected through a fluid line 333 provided with a restriction 367 to the fluid line 322 at a point downstream of a restriction 366.

The torque converter 10 has a port 10a connected through a fluid line 334 provided with a restriction 368 to a fluid line 325, a port 10b connected to a fluid line 326, and a port 10c connected through a fluid line 335 to a port 250a of a pressure-retaining valve 250. The pressure retaining valve 250 has ports 250b and 250c, the former being connected through a fluid line 336 to the fluid line 322 at a location upstream of the restriction 366, the latter being led to the drain EX through a fluid line 337 provided with an oil cooler 260. All of the drains EX aforementioned terminate in the tank 55.

Operating oil in the oil tank 55 is sucked and pressurized by the hydraulic oil pump 50 and then delivered to a fluid line 300 after having its pressure regulated by the regulator valve 60 to a predetermined level (the line pressure P1). A spring receiver cylinder 61 of the regulator valve 60 is disposed in urging contact with the stator arm 17a (FIG. 1), such that when the reaction force created by the stator 16 of the torque converter 10 exceeds a predetermined value the spring 62 is compressed by the stator arm 17a to thereby elevate the discharge pressure of the hydraulic oil pump 50 (hence the line pressure P1). A hydraulic oil control system of this kind is disclosed in detail by Japanese Patent Publication No. 45-30861. Part of the operating oil regulated in pressure by the regulator valve 60 is delivered to the torque converter 10 by way of a restriction 368 and then returned to the tank 55 by way of the pressure-retaining valve 250 and the oil cooler 260.

The pressure-regulated operating oil from the regulator valve 60 is also delivered to the manual shift valve 70. The manual valve 70 is manually shifted by the driver to select six operating modes, i.e., P (parking), R (rearward), N (neutral), D4 (four-forward-speed automatic gear shifting), D3 (three-forward-speed automatic gear shifting exclusive of TOP speed), and 2 (second speed-holding position). When the spool 71 of the manual valve 70 is in the N position as shown in FIG. 2, the port 70b communicating with the hydraulic oil pump 50 via the fluid line 300 is blocked by the spool 71, while all the other ports of the valve 70 are in communication with the drain EX whereby the four clutches C1–C4 for first–fourth speeds are all disengaged, to thereby interrupt the transmission of the engine torque to the driving wheels 42 and 43 (FIG. 1).

When the spool 71 of the manual valve 70 is shifted leftward by one position from the position N, i.e., when the position D4 is assumed, the fluid lines 302 and 307 are both brought into communication with the fluid line 300 to be supplied with the pressurized oil, and at the same time the fluid lines 305 and 306 are brought into communication with each other. On this occasion, the fluid line 309 neither communicates with the drain EX nor with the fluid line 308, while the fluid line 301 maintains its communication with the drain EX. As a result, when the D4 position (range) is assumed, the servo piston 90 for shifting the selector sleeve 38 (FIG. 1) has its spring chamber 92 supplied with discharge pressure from the pump 50, whereby the spool 91 is hydrodynamically locked in the position of FIG. 2 and the selector sleeve 38 is maintained in the position shown in FIG. 1 by the shift fork 39 secured to one end of the spool 91. Consequently, the fourth-speed driven gear 33 brought into engagement with the spline 35, and the reverse driven gear 34 is rendered freely rotatable.

Even when the spool 71 of the manual valve 70 is moved leftward by one position from the D4 position to assume the D3 position, there occurs no change in the relationship of connection between the fluid lines in communication with the manual valve 70, except that the fluid line 309 is caused to communicate with the drain EX via the ports 70m and 70n. When either the D3 position or the D4 position is assumed, the pressurized oil is supplied to the throttle valve 100. The throttle valve 100 is so constructed that as a cam 104 urging the spool 102 rotates counter-clockwise, as viewed in FIG. 2, through an angle proportionate to an increase in the throttle valve opening (the stepping amount of the throttle pedal), the spool 101 is displaced leftward against the force of a spring 103 to open the port 100a, and accordingly the discharge pressure from the port 100c is applied by way of the restriction 352 to the port 100b to thereby move the spool 101 rightward so as to reduce the opening of the port 100a to thereby supply the fluid line 311 with a pressure proportionate to the throttle valve opening. Also counter-clockwise rotation of the cam 104 causes the spool 102 to slide leftward so as to gradually diminish gradually the communication between the port 100d and the drain EX, thereby preventing a shock to be caused by gear shifting from the third speed (3RD) to the second speed (2ND) through kicking-down of the throttle pedal.

A cam 113 of the control valve 110 interlocked with the cam 104 rotates counter-clockwise in response to an increase in the throttle valve opening to cause leftward displacement of a spool 111 so as to gradually diminish the communication between the port 110c and the drain EX to thereby prevent a shock to be caused by gear shifting from the fourth speed ratio (TOP) to the third speed ratio (3RD). This control valve also serves to communicate between bypass passages 313 and 314 bypassing the restriction 351 in the fluid line 307 extending between the manual valve 70 and the shift valve 120 to thereby cancel the throttling effect to be provided by the restriction 351 and accordingly increase the amount of pressurized oil supplied to the shift valve 120. This can achieve prompt engagement of a higher speed clutch upon sudden acceleration.

On the other hand, discharge oil from the hydraulic pump 50 is also delivered to the governor valve 80 which is driven by the final driven gear 40 shown in FIG. 1 through a gear 81 meshing therewith to rotate at a speed proportionate to the vehicle speed whereby an output pressure or governor pressure proportionate to the vehicle speed is generated due to the action of a centrifugal force upon its flyweights 83 and supplied into the output fluid line 322 indicated by the broken line.

The shift valve 120 connects the input line 307 to the output line 316 when it is in a first position illustrated in FIG. 2, and at the same time connects another output line 317 to the drain EX. The shift valve 120 has a valve body 121 urged toward the first position by the force of a spring 122. The valve body 121 of the shift valve 120 is also displaceable leftward against the force of the spring 122, in response to a reduced pressure lower than the line pressure P1, which is introduced into a hydraulic pressure chamber 120A defined in part by a right end face of the valve body 121, through a fluid line 341 and a restriction 361 therein, to assume a second position. When this second position is assumed, the output line 316 is connected to the drain EX through the fluid line 315, and at the same time the line 317 is disconnected from the fluid line 318 and connected to the input line 307.

Irrespective of whether the shift valve 120 assumes the first position or the second position, the input line 307 is kept connected to the first-speed (LOW) clutch C1. Accordingly, when the manual valve 70 assumes the D3 position or the D4 position, the first-speed clutch C1 remains engaged. The spool 121 of the shift valve 120 is controlled by the solenoid valve 140 in a manner such that when the solenoid valve 140 is closed, the second position is assumed due to the reduced pressure introduced into the hydraulic pressure chamber 120A from the pressure-reducing valve 270, while when the solenoid valve 140 is open, the first position is due to by the action of the spring 122.

The shift valve 130, when assuming a first position as illustrated, blocks the input line 316 and connects the output port 130d to the drain EX, the input line 317 to the output line 305, and another output line 320 to the drain EX via the fluid line 312, respectively. The shift valve 130 has a spool 131 urged toward the first position by a spring 132. The valve body 131 of the shift valve 130 is also displaceable leftward against the force of the spring 132 in response to the governor pressure PG which is introduced into a hydraulic pressure chamber 130A defined in part by an enlarged right end face of the spool 131 through the fluid line 322 and a port 130i, and also into a chamber 130B defined in part by a smaller-diameter right end of the spool through the fluid line 322 and a port 130h, to assume a second position. When the second position is assumed, an output port 130d is disconnected from the drain EX and connected to the input line 316, the output line 305 is connected to the drain EX through the fluid line 319, and the output line 320 is disconnected from the fluid line 312 and connected to the input line 317. The spool 131 of the shift valve 130 is controlled by the solenoid valve 150 in a manner such that when the solenoid valve 150 is closed, the second position is assumed due to the action of the governor pressure PG introduced into the hydraulic pressure chamber 130B, while when the solenoid valve 150 is open, the first position is assumed due to the action of the spring 132.

A click motion 133 is provided in the shift valve 130 for causing a position-changing motion of the spool 131 to be carried out in a sharp or definite manner. This click motion 133 serves to hold the spool 131 of the shift valve 130 in the first position or in the second position when the solenoid valve 150 becomes inoperative while it is in the open position.

The solenoid valves 140, 150 each have a valve body 141, 151 held in a position of blocking a port 140a, 150a by the force of a spring 143, 153 when the respective solenoid 142, 152 is deenergized, and held in another position of opening the port 140a, 150a against the force of the spring 143, 153 when the solenoid is energized. In this way, the solenoid valve 140, 150 is closed and opened, respectively, in response to deenergization and energization of the solenoid valve 142, 152.

The solenoids 142, 152 of the solenoid valves 140, 150 are electrically connected to an electronic control unit 400, which is responsive to input signals from a sensor 401 for sensing the position of the manual valve 70, an engine rotational speed sensor 402, a vehicle speed sensor 403, etc. to control the solenoid valves 140, 150 in accordance with a predetermined gear shifting manner using a gear shifting map or the like, to thereby selectively engage or disengage the first speed–fourth-speed clutches C1–C4 for control of the gear-shifting operation of the transmission.

During rotation of the engine, operating fluid pressurized by the hydraulic pump 50 is delivered to the governor valve 80 and then regulated thereby into a signal pressure proportionate to the vehicle speed to be supplied to the hydraulic pressure chambers 130A, 130B of the shift valve 130. The same pressurized operating fluid pressure is also supplied to the pressure-reducing valve 270 and the resulting reduced pressure is supplied to the hydraulic pressure chamber 120A of the shift valve 120. To maintain these shift valves 120, 130 in the respective first positions as illustrated when the manual valve 70 assumes the D4 position or the D3 position, the solenoids 142, 152 of the solenoid valves 140, 150 are both energized to open the valves. By doing so, the first-speed clutch C1 alone is engaged while the other clutches C2–C4 are not engaged, thus establishing the first speed ratio. Since the first speed ratio is generally intended to be established when the vehicle is running in a low speed region wherein the governor pressure PG is also low, the loss of the flow rate of the operating fluid to be returned to the tank 55 through the solenoid valve 150 and the restriction 362 is accordingly small, thus being economical. This is particularly advantageous when it is desired to maintain the operating fluid pressure at a high level throughout the hydraulic control system, i.e. at a level considerably higher than the normal pressure level (the line pressure P1), such as at standing start of the vehicle with the engine stalled where the vehicle speed is zero.

Next, if the solenoid valve 140 has its solenoid deenergized to be closed while the other solenoid valve 150 is kept energized with its solenoid 152 continually energized, a pressure reduced by the pressure-reducing valve 270 and introduced into the hydraulic pressure chamber 120A causes leftward displacement of the spool 121 of the shift valve 120 against the force of the spring 122. As a result, the fluid line 307 becomes connected to the fluid line 305 through the fluid line 317, which is connected to the fluid line 304 via a notch 71a in the spool 71 of the manual valve 70 and the fluid line 306 when the manual valve 70 assumes the D4 position, and connected to the fluid line 304 via an annular groove 71b in the spool 71 when the manual valve 70 assumes the D3 position. Thus, on this occasion, irrespective of whether the D4 position or the D3 position is assumed, the second-speed clutch C2 is engaged. In this way, with the D4 position or the D3 position assumed, the first-speed clutch C1 and the second-speed clutch C2 are both engaged. However, as shown in FIG. 1, the one-way clutch C5 interposed between the first-speed driven gear 36 and the counter shaft 30 then allows torque transmission only from the engine to the driving wheels, thus establishing the second speed ratio.

Then, if the solenoid 152 of the solenoid valve 150 is also deenergized while the solenoid 142 of the solenoid valve 140 is kept deenergized, the hydraulic pressure chambers 130A, 130B of the shift valve 130 are supplied with governor pressure PG indicative of the vehicle speed then assumed. Since the force of the spring 132 is set at a value smaller than the force of the governor pressure PG, the spool 131 is then moved leftward to assume the second position, whereby the fluid line 305 becomes connected to the drain EX via the fluid line 319, and the fluid line 320 becomes connected to the fluid line 317 leading to the operating fluid source, thereby causing engagement of the third-speed clutch C3. At the same time, the second-speed clutch C2 becomes connected to the drain EX through the fluid lines 304, 305, and 319 to be disengaged. Also on this occasion, the first-speed clutch C1 remains engaged, but the one-way clutch C5 acts to cause establishment of the third speed ratio.

Next, if the solenoid 142 of the solenoid valve 140 is again energized with the solenoid 152 of the solenoid valve 150 kept deenergized, the spool 121 of the shift valve 120 is moved rightward to again assume the illustrated position, to connect the fluid line 317 to the drain EX through the fluid line 318, as well as to connect the fluid line 316 to the input line 307, to thereby supply pressurized oil to the fluid line 310. The fluid line 310 is connected by way of the ports 70m and 70k of the manual shift valve 70 to the fluid line 309, whereupon the fourth-speed clutch C4 is engaged. On this occasion, the fluid line 304 is connected to the drain EX via the fluid lines 305 and 319, similarly as explained above, and also the fluid line 320 is connected to the drain EX via the ports 130f and 130c of the shift valve 130, the fluid line 317, the ports 120d and 120e of the shift valve 121, and the fluid line 318, whereupon the second-speed clutch C2 and the third-speed clutch C3 are disengaged. Although the first-speed clutch C1 remains engaged at this time, the fourth speed ratio alone is established due to the action of the one-way clutch C5 as stated above. In the manner as stated heretofore gear shifting between the four speed ratios is automatically carried out.

Table 1 shows, by way of example, the relationship between the speed ratios and the energizing condition of the solenoids 142 and 152, of the solenoid valves 140 and 150.

TABLE I

|  | Solenoid 142 | Solenoid 152 |
| --- | --- | --- |
| First Speed (LOW) | energized | energized |
| Second Speed | deenergized | energized |
| Third Speed | deenergized | deenergized |
| Fourth Speed (TOP) | energized | deenergized |

As is learned from this table, if the electronic control unit 400 malfunctions for some reason to energize the solenoid 152 of the solenoid valve 150 while the vehicle is running with the fourth speed (TOP) established, the first speed ratio (LOW) is established, and similarly if the same malfunction occurs while the vehicle is running with the third speed ratio established (i.e., while the manual valve 70 is in the D3 position), the second speed ratio is established. Further, if the malfunction of the electronic control unit 400 results in that the solenoid 152 is energized and the solenoid 142 is deenergized while the vehicle is running with the fourth speed ratio (TOP) established, the second speed ratio is also established.

According to the invention, the governor pressure PG is directly supplied to the hydraulic pressure chamber 130A of the shift valve 130 in order to cope with such malfunctions. For this purpose, the port 130h of the shift valve 130 is connected to the fluid line 322, as well as to the port 150a of the solenoid valve 150 by way of the restriction 362, and also the port 130i is connected to the fluid line 322, which leads to the outlet port 80b of the governor valve 80.

Hence, while the vehicle is running at a higher speed, i.e., while the fourth speed ratio or the third speed ratio is established, the governor pressure PG is maintained sufficiently high, and this governor pressure PG is directly applied through the fluid line 322 to the hydraulic pressure chamber 130A of the shift valve 130, that is, to the stepped right end surface of the spool 131 exposed in the hydraulic pressure chamber 130A. Therefore, even if the solenoid valve 150 should be opened by any chance and the hydraulic pressure chamber 130B of the shift valve 130 is relieved of the pressure applied thereto, the spool 131 is kept in its leftmost position, i.e., the shift valve 130 is maintained in its second postion. Since the governor pressure PG is applied statically to the spool 131, the latter is hardly influenced by a temperature variation that causes a change in the viscosity and fluidity of the pressurized oil as well as by an aging change of the dimensions of the restriction 362. As a result, the shift valve 130 performs stably. Further, this arrangement according to the invention requires no additional valves, offering advantages of compact space and low cost.

Further, should the driving system for the solenoid valve 150 malfunction to have the solenoid 152 of the solenoid valve 150 always deenergized when the vehicle speed is zero, that is, when the vehicle is at rest, the governor pressure PG is zero. Accordingly, the shift valve 130 assumes the first position as shown in FIG. 2, so that irrespective of whether or not the the solenoid valve 140 is open or closed at the time of malfunction either the first speed ratio (LOW) or the second speed ratio (2ND) is established, thus obtaining sufficient starting accelerability.

In this manner, the malfuctioning electronic control unit 400 is backed up.

The govorner pressure PG generated by the governor valve 80 is also used for controlling the locking-up force or engaging force of the automatic transmission. That is, the governor pressure PG is used to increase the engaging force (capacity) of the direct-coupling clutch Cd of the torque converter 10 as the vehicle speed increases. A surplus of the flow from the pump 50 passing through the regulator valve 60 is delivered through the restriction 368 into the torque converter 10 to thereby increase the internal pressure thereof and also is delivered to the timing valve 210. This timing valve 210 has hydraulic pressure chambers 210A and 210B which are, respectively, subjected to oil pressures to be applied to the second-speed clutch C2 and the fourth-speed clutch C4, so that the spool 211 is moved leftward against the force of the spring 212 to assume a second shift position when the second or the fourth speed ratio is established, and when the first speed or the third speed ratio is established the spool 211 is moved rightward by the force of the spring 212 to assume a first shift position as shown in FIG. 2.

The timing valve 210, whichever of the two shift positions may be assumed, connects the input fluid line 325 from the regulator valve 60 to the output fluid line 327, but while it is shifting from one position to the other it disconnects the fluid line 327 from the fluid line 325, and connects the fluid line 326 leading to the cylinder 7 of the direct coupling clutch Cd to the drain EX by way of a bore 211a in the spool 211 of the timing valve 210. When the pressure in the cylinder 7 falls, the internal pressure of the torque converter 10 surpasses the urging force of the piston 6 to displace same leftward to thereby release the the direct-coupling clutch Cd from its locked-up state. In this way, the timing valve 210 serves to interrupt the locking-up of the direct-coupling clutch Cd of the torque converter 10 in synchronism with gear shifting.

The pressurized oil through the output fluid line 327 from the timing valve 210 is supplied to the modulator valve 220 to be modulated therein and discharged therefrom into the fluid line 330. The modulator valve 220 serves to increase the operating oil pressure acting on the hydraulic cylinder 7 of the direct-coupling clutch Cd in response to an increase in the vehicle speed and/or the throttle valve opening. The modulator valve 220 is constructed such that the governor pressure PG and the throttle pressure Pt are applied, respectively, to hydraulic pressure chambers 220A and 220B of the modulator valve 220, respectively, through the fluid lines 322 and 311 whereby the two pressures cooperate to move the spool 221 leftward to thereby open the valve, and that a pressure in the output line 330 is applied through the restriction 365 to a left end face of the spool so that the spool 221 moves against the governor pressure PG, the throttle pressure Pt and the force of the spring 222, to thereby close the valve. Consequently, the output fluid line 330 is always supplied with a pressure proportionate to the vehicle speed and the throttle valve opening.

This output fluid line 330 is connected through the on-off valve 230 to the cylinder 7 of the direct-coupling clutch Cd in the torque converter 10. Therefore, the engaging force (capacity) of the direct-coupling clutch Cd is increased to a value commensurate with the vehicle speed and the throttle valve opening. Upon receiving in its hydraulic pressure chamber 230A the throttle pressure Pt by way of the fluid line 311, the on-off valve 230 connects the input fluid line 330 to the output fluid line 326, but when the throttle pressure Pt is zero, i.e., when the throttle opening assumes an idling degree, the on-off valve 230 connects the output fluid line 326 to the drain EX. This on-off valve 230 therefore serves to release the direct-coupling clutch Cd from the locked-up state when the throttle valve assumes the idle position. Details of the direct-coupling clutch and the manner of control of same responsive to the vehicle speed are disclosed in Japanese Provisional Patent Publication (Kokai) No. 60-84466.

The solenoid valve 240 is arranged across the fluid line 333 branching off from the hydraulic pressure chamber 220A of the modulator valve 220, which is supplied with the governor pressure PG, and connected to the drain line EX, to close and open the same line 333. The solenoid valve 240 is a normally-closed type, wherein a valve body 241 is urged by the force of a spring 243 to close the port 240a when a solenoid 242 is in a deenergized state, whereas the valve body 240 is returned by the force of the spring 243 to open the port 240a when the solenoid 242 is energized. The fluid lines 322 and 333 are provided, respectively, with restrictions 366 and 367 which serve to lower the internal pressure within the hydraulic pressure chamber 220A of the on-off valve when the solenoid valve 240 is opened. That is, these restrictions 366, 367 act to weaken the governor pressure PG acting upon the mudulator valve 220. When the solenoid valve 240 has its solenoid 242 energized to open, the pressure within the output fluid line 330 from the modulator valve 220 lowers to weaken the engaging force (capacity) of the direct-coupling clutch CD.

The solenoid 242 of the solenoid valve 240 is controlled by the electronic control unit 400 in response to the rotational speed ratio e between the input and output elements of the torque converter 10. To be specific, when the rotational speed ratio e exceeds a predetermined reference value, the solenoid 242 is energized by the control unit 400 to weaken the engaging force of the direct-coupling clutch CD so as to maintain the rotational speed ratio e within a predetermined range. Such control system is disclosed in U.S. Ser. No. 669,817.

The two solenoid valves 140, 150 taking part in the gear shifting operation and the solenoid valve 240 taking part in controlling the rotational speed ratio e between the input and output elements of the direct-coupling clutch CD of the torque converter 10 cooperate to prevent a shock to be caused at gear shifting of the transmission. That is, when gear shifting is to be effected, the electronic control unit 400 opens the solenoid valve 240 beforehand to weaken the engaging force of the direct-coupling clutch CD to some degree, just before the solenoid valve 140 or the solenoid valve 150 starts to be shifted in position. By doing so, interruption of the locking-up of the direct-coupling clutch CD is performed smoothly in synchronism with the gear shifting operation even if there occurs a slight change in the timing of operation of the timing valve 210 with respect to the gear shifting action of the transmission, thereby reducing the magnitude of a shock caused by the gear shifting action. This function shows a remarkable effect particularly when the transmission is shifted down from a high speed gear to a low speed gear. More specifically, at the time of shifting-down, the engine rotational speed increases by an amount corresponding to the difference in gear ratio between the high speed gear and the low speed gear after the gear shifting is carried out. Therefore, by weaking the engaging force of the direct-coupling clutch CD so as to allow a slip in the clutch in advance of a gear shifting action, the engine rotational speed can already be increased at the time of the gear shifting action, thereby reducing the amount of a variation in the engine rotational speed to be caused by the gear shifting. The electronic control unit 400 keeps the solenoid valve 240 closed for a short period of time after a gear shifting operation is finished. And after the lapse of the short period of time, the solenoid valve 240 is allowed to resume the control of the rotational speed ratio e.

Figure 3:
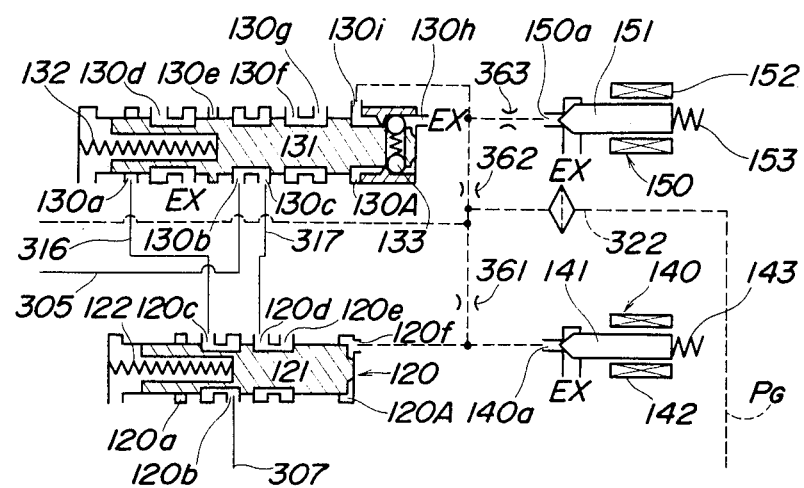
FIG. 3 is a fragmentary circuit diagram illustrating essential part of the back-up device, according to a second embodiment of the invention.

FIG. 3 shows another embodiment of the back-up device according to the invention. In this embodiment, the pressure-reducing valve 270 appearing in FIG. 2 is omitted. A fluid line communicating between the port 120f of the hydraulic pressure chamber 120A of the shift valve 120 and the port 140a of the solenoid valve 140 is connected to the fluid line 322 via the restriction 361 to supply the governor pressure PG to the hydraulic pressure chamber 120A of the shift valve 120. The port 130i of the hydraulic pressure chamber 130A of the shift valve 130 is connected to the port 150a of the solenoid valve 150 via the restriction 363, while the port 130h of the hydraulic pressure chamber 130B is connected to the drain line EX, and the hydraulic pressure chamber 130A is disposed to be supplied with the governor pressure PG via the restriction 362. The arrangement of the other elements, not referred to above, is just identical with that of FIG. 2, description of which is therefore omitted.

Figure 4:
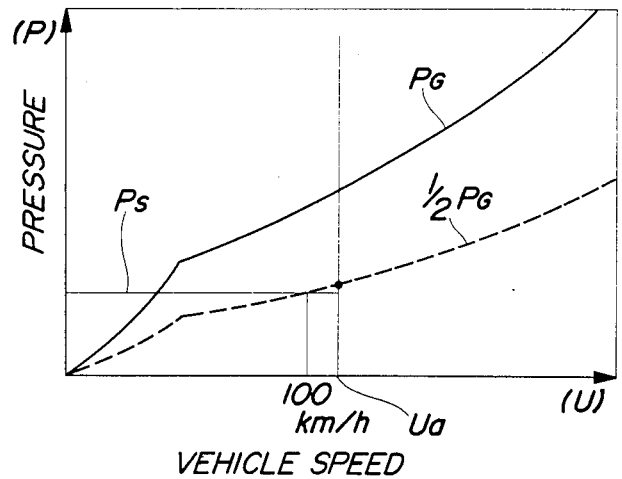
FIG. 4 is a graph showing the relationship between the governor pressure used in the hydraulic control system in FIG. 3, the internal pressure of a hydraulic pressure chamber 130A of a shift valve 130 in FIG. 3, and the vehicle speed.

During high speed running of the vehicle with the fourth speed ratio or the third speed ratio established, the governor pressure PG is at a sufficiently high level so that a large amount of pressurized oil is supplied to the hydraulic pressure chamber 130B of the shift valve 130 via the restriction 362. Therefore, even if the solenoid valve 150 is opened due to occurrence of a fault in the electronic control unit 400, etc., there can be developed a high pressure within the hydraulic pressure chamber 130A, which can overcome the force of the spring 132 to bias the spool 131 in the leftmost or second position, since the drain amount of oil returning to the drain line EX is restricted by the restriction 363. This effect can be positively attained by setting the opening area ratio between the restrictions 362 and 363 at a suitable value. If the opening areas of the restrictions 362, 363 are set at the same value, the pressure developed within the hydraulic pressure chamber 130A will be equal to $\frac{1}{2} \times PG$ when the solenoid valve 150 is open. Let it now be assumed that the force (setting load) PS of the spring 132 is set equal to the pressure ($\frac{1}{2} \times PG$) developed within the hydraulic pressure chamber 130A when the vehicle is running at a speed 100 km/h as indicated by the broken line in FIG. 4, provided that the maximum vehicle speed U that can be assumed with establishment of the second speed ratio is set at 95 km/h for instance. With this assumption, when the vehicle is running at a speed Ua higher than 100 km/h, at which the engine 1 will undergo overrevolution if the second speed ratio is established, the spool 131 of the shift valve 130 is held in the leftmost or second position by the pressure within the hydraulic pressure chamber 130A against the force of the spring 142, even if the solenoid valve 150 has its solenoid 152 energized to open. That is, the spool 131 assumes the same position as one assumed when the solenoid 152 is deenergized. Thus, gear shifting to the second speed gear can be prevented. In this way, the electronic control unit can be backed up.

Figure 5:
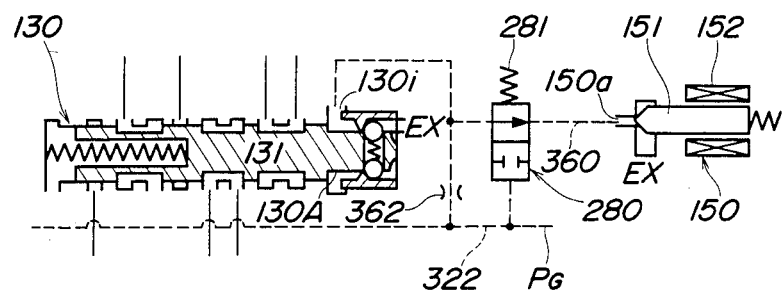
FIG. 5 is a view similar to FIG. 3, showing a third embodiment of the invention.

Incidentally, although in the FIG. 3 embodiment the restriction 363 is arranged in the fluid line 360 extending between the hydraulic pressure chamber 130A of the shift valve 130 and the port 150a of the solenoid valve 150, the same restriction 363 may be omitted if the opening area of the port 150a is set at a suitably small value. Also, the restriction 363 may be replaced by a valve 280 as shown in FIG. 5, which is arranged across the fluid line 360 extending been the hydraulic pressure chamber 130A of the shift valve 130 and the port 150a of the solenoid valve 150, with one end face of its valve body acted upon by the governor pressure PG from the fluid line 322 and the other end face by the force of a spring 281, respectively, so that the valve is opened by the force of the spring. When the vehicle speed exceeds 100 km/h during high speed running of the vehicle, the correspondingly increased governor pressure PG displaces the valve body into its closed position against the force of the spring 281.

Further, in the FIG. 5 arrangement, the hydraulic pressure chamber 130A may be alternatively arranged to be supplied with the discharge pressure from a valve corresponding to the pressure-reducing valve 270 appearing in FIG. 2, in place of the governor pressure PG.

Figure 6:
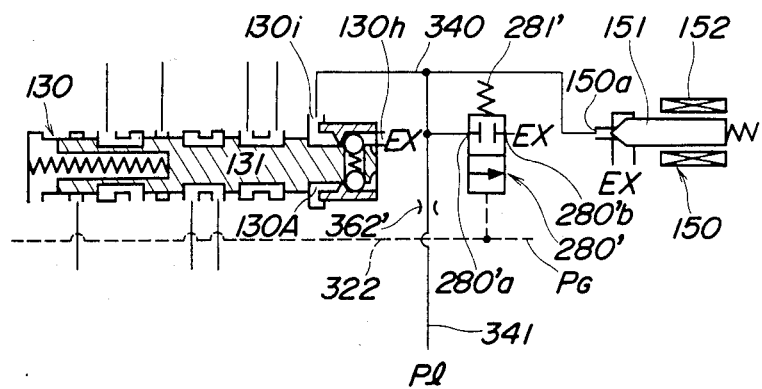
FIG. 6 is a view similar to FIG. 3, showing a fourth embodiment of the invention.

FIG. 6 illustrates a further embodiment of the invention. A control valve 280' is arranged to have one end face of its valve body acted upon by the governor pressure PG from the fluid line 322 and the other end face by the force of a spring 281', respectively, but disposed to be closed by the force of the spring 281' overcoming the governor pressure PG in a manner contrary to the valve 280 in FIG. 5. A port 280'a is connected to the fluid line 340 connecting between the port 130i of the hydraulic pressure chamber 130A of the shift valve 130 and the port 150a of the solenoid valve 150, and another port 280'b is connected to the drain line EX. The fluid line 340 is connected to a fluid line transmitting the line pressure P1, e.g. the fluid line 300 in FIG. 2, via the fluid line 341 having a restriction 362' therein. The solenoid 152 of the solenoid valve 150 is arranged to be energized and deenergized in a manner contrary to the manner described with respect to the arrangements of FIGS. 1–5.

Although in the foregoing embodiments two shift valves 120, 130 are employed for shifting between the first speed ratio to the fourth speed ratio, this is not limitative, but three shift valves may be employed, for instance, respectively, for shifting between the first and second speed ratios, the second and third speed ratios, and the third and fourth speed ratios. In this alternative arrangement, the shift valve for shifting between the second and third speed ratios may be arranged to be held in a position of establishing the third speed ratio or the fourth speed ratio in response to the governor pressure, when the vehicle speed exceeds a predetermined value.

What is claimed is:

1. In an electronic control system of an automatic transmission in an automotive vehicle, said automatic transmission having at least two speed ratios including a first speed ratio for lower speed running of said vehicle and a second speed ratio for higher speed running of said vehicle, and forming part of a power transmission system connected between an engine of said vehicle and driving wheels of said vehicle, said electronic control system including a first frictionally engaging element hydraulically actuatable for establishing said first speed ratio, a second frictionally engaging element hydraulically actuatable for establishing said second speed ratio, an operating fluid source, selector valve means for selectively connecting said operating fluid source to said first and second frictionally engaging elements, said selector valve means being adapted to selectively assume a first position for establishing said first speed ratio and a second position for establishing said second speed ratio, electromagnetic valve means for driving said selector valve means to select said first position or said second position, and electronic control means for selectively energizing and deenergizing said electromagnetic valve means in accordance with a predetermined gear shifting manner responsive to an electrical signal indicative of the speed of said vehicle and an electrical signal indicative of output from said engine, the improvement comprising a back-up device comprising vehicle speed sensing means for generating an output signal having a value thereof increasing as the speed of said vehicle increases, and control means for causing said selector valve means to assume said second position irrespective of the operation of said electromagnetic valve means, when the value of said output signal from said vehicle speed sensing means exceeds a predetermined value.

2. A back-up device as claimed in claim 1, wherein said output signal from said vehicle speed sensing means is indicative of governor pressure proportionate to the speed of said vehicle.

3. A back-up device as claimed in claim 1, wherein said selector valve means comprises a valve body having a first pressure-receiving face upon which hydraulic pressure acts in a direction of said second position, a first hydraulic pressure chamber defined in part by said first pressure-receiving face, a first fluid line having a restriction therein and connecting between said first hydraulic pressure chamber and said operating fluid source for supplying the former with hydraulic pressure from the latter, a drain line connecting between said first hydraulic pressure chamber and a zone under a lower pressure, said electromagnetic valve means being arranged across said drain line for selectively closing and opening same, said control means of said back-up device comprising a second pressure-receiving face provided on said valve body of said selector valve means, upon which hydraulic pressure acts in a direction of said second position, a second hydraulic pressure chamber defined in part by said second pressure-receiving face, and a second fluid line connecting between said second hydraulic pressure chamber and said vehicle speed sensing means for directly supplying the former with a governor pressure from the latter.

4. A back-up device as claimed in claim 1, wherein said selector valve means comprises a valve body having a pressure-receiving face upon which hydraulic pressure acts in a direction of said second position, a hydraulic pressure chamber defined in part by said pressure-receiving face, a drain line connecting between said hydraulic pressure chamber and a zone under a lower pressure, said electromagnetic valve means being arranged across said drain line for selectively closing and opening same, said control means of said back-up device comprising a fluid line having a first restriction therein and connecting between said hydraulic pressure chamber and said vehicle speed sensing means for supplying the former with a governor pressure from the latter, and a second restriction provided in said drain line.

5. A back-up device as claimed in claim 1, wherein said selector valve means comprises a valve body having a pressure-receiving face upon which hydraulic pressure acts in a direction of said second position, a hydraulic pressure chamber defined in part by said pressure-receiving face, a drain line connecting between said hydraulic pressure chamber and a zone under a lower pressure, said electromagnetic valve means being arranged across said drain line for selectively closing and opening same, said control means of said back-up device comprising a fluid line having a restriction therein and connecting between said hydraulic pressure chamber and said vehicle speed sensing means for supplying the former with said governor pressure from the latter, and a control valve arranged across said drain line for selectively closing and opening same, said control valve being adapted to close said drain line when the speed of said vehicle exceeds a predetermined value.

6. A back-up device as claimed in claim 1, wherein said selector valve means comprises a valve body having a pressure-receiving face upon which hydraulic pressure acts in a direction of said second position, a hydraulic pressure chamber defined in part by said pressure-receiving face, a first drain line connecting between said hydraulic pressure chamber and a zone under a lower pressure, said electromagnetic valve means being arranged across said first drain line for selectively closing and opening same, said control means of said back-up device comprising a fluid line having a restriction therein and connecting between said hydraulic pressure chamber and said operating fluid source for supplying the former with hydraulic pressure from the latter, a second drain line connecting between said fluid line and said lower pressure zone at a location intermediate between said hydraulic pressure chamber and said restriction, and a control valve arranged across said second drain line for selectively closing and opening same, said control valve being adapted to close said second drain line when the speed of said vehicle exceeds a predetermined value.

* * * * *